United States Patent
Varma et al.

(10) Patent No.: US 11,093,365 B2
(45) Date of Patent: Aug. 17, 2021

(54) SYSTEM FOR SPLICING AND FORMATTING CODE VIA MACHINE LEARNING

(71) Applicant: Bank of America Corporation, Charlotte, NC (US)

(72) Inventors: Jayachandra Varma, Irving, TX (US); Manu Jacob Kurian, Dallas, TX (US); Anuradha Girish Sethuram, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/511,958

(22) Filed: Jul. 15, 2019

(65) Prior Publication Data
US 2021/0019248 A1 Jan. 21, 2021

(51) Int. Cl.
*G06F 11/36* (2006.01)
*G06N 3/04* (2006.01)
(Continued)

(52) U.S. Cl.
CPC ....... *G06F 11/3604* (2013.01); *G06N 3/0454* (2013.01); *G06N 20/00* (2019.01); *G06F 3/0484* (2013.01)

(58) Field of Classification Search
CPC ........ G06N 20/00; G06N 5/04; G06N 3/0454; G06F 11/3604; G06F 3/0484;
(Continued)

(56) References Cited

U.S. PATENT DOCUMENTS

| 5,195,095 A | 3/1993 | Shah |
| 5,282,212 A | 1/1994 | Shah |

(Continued)

OTHER PUBLICATIONS

Long Wen et al.; A New Convolutional Neural Network-Based Data-Driven Fault Diagnosis Method; IEEE; pp. 5990-5998; retrieved on May 3, 2021. (Year: 2017).*

(Continued)

*Primary Examiner* — S. Sough
*Assistant Examiner* — Cuong V Luu
(74) *Attorney, Agent, or Firm* — Michael A. Springs; Moore & Van Allen PLLC; Nicholas C. Russell

(57) ABSTRACT

Embodiments of the present invention provide a system for identifying, splicing, and formatting code via machine learning for application analysis. In particular, the system may generate a repository that links multiple historical codes with associated analysis parameters. When a request for a new set of analysis codes is requested for analyzing a first application, the system can determine a set of analysis parameters associated with that first application and determine the set of analysis codes for analyzing the first application through machine learning analysis of the repository. The system may then generate the set of analysis codes by splicing together the determined set of analysis codes and formatting the codes into a format that is compatible with the first application. The system may then automatically execute the code on the first application within a testing environment and display the results on a computing device of an associated user.

15 Claims, 5 Drawing Sheets

(51) Int. Cl.
*G06N 20/00* (2019.01)
*G06F 3/0484* (2013.01)

(58) Field of Classification Search
CPC ............. G06F 11/3684; G06F 11/3688; G06F 11/3664; G06F 11/3692; G06F 11/3672; G06F 11/263
See application file for complete search history.

(56) References Cited

U.S. PATENT DOCUMENTS

| | | |
|---|---|---|
| 5,805,795 A | 9/1998 | Whitten |
| 7,174,348 B1 | 2/2007 | Sadhu et al. |
| 7,409,592 B2 | 8/2008 | Decker |
| 8,151,276 B2 | 4/2012 | Grechanik et al. |
| 8,799,869 B2 | 8/2014 | Grechanik |
| 9,038,026 B2 | 5/2015 | Chandra et al. |
| 9,063,673 B2 | 6/2015 | Weigert et al. |
| 9,098,621 B2 | 8/2015 | Zheng et al. |
| 9,535,818 B2 | 1/2017 | Vasudevan et al. |
| 9,710,364 B2 | 7/2017 | Herzig et al. |
| 10,235,277 B2 | 3/2019 | Herzig et al. |
| 2002/0042687 A1 | 4/2002 | Tracy et al. |
| 2005/0166094 A1 | 7/2005 | Blackwell et al. |
| 2007/0106982 A1 | 5/2007 | Dalal et al. |
| 2007/0130561 A1 | 6/2007 | Siddaramappa et al. |
| 2007/0162522 A1 | 7/2007 | Sengupta et al. |
| 2008/0263505 A1 | 10/2008 | StClair et al. |
| 2015/0095893 A1* | 4/2015 | Tripp .................. G06F 11/3684 717/127 |
| 2015/0113330 A1* | 4/2015 | Grondin ............. G06F 11/3684 714/38.1 |
| 2017/0068614 A1 | 3/2017 | Jayaraman et al. |
| 2017/0277710 A1* | 9/2017 | Saaroni .................. G06F 16/25 |
| 2017/0329687 A1 | 11/2017 | Chorley et al. |
| 2018/0089069 A1* | 3/2018 | Tandi .................. G06F 11/3684 |
| 2019/0213115 A1* | 7/2019 | Takawale .................. G06F 8/30 |
| 2020/0042434 A1* | 2/2020 | Albertson ............ G06K 9/6267 |
| 2020/0341888 A1* | 10/2020 | Sridhar ............... G06F 11/3692 |

OTHER PUBLICATIONS

Meenakshi Vanmali et al.; Using a Neural Network in the Software Testing Process; John Wiley & Sons; pp. 45-62; retrieved on May 3, 2021. (Year: 2002).*

* cited by examiner

SYSTEM FOR SPLICING AND FORMATTING CODE VIA MACHINE LEARNING

BACKGROUND

The development and improvement of applications involves the execution of sets of code or scripts that perform effectiveness and quality analysis for how an application operates on its own, across its system environment, and with third party interfaces. Traditionally, developers either create a new set of application testing codes or recycle and modify existing application testing codes for each new or revised application that is being tested. However, this process is labor intensive, inefficient, and does not place much emphasis on indirect implications of the application being tested. Therefore, a need exists to utilize machine learning models to identify appropriate application testing codes for end-to-end testing, splice together identified application testing codes, re-format the identified code into compatible formats, and execute the formatted application testing codes on the application being analyzed within a testing environment.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for splicing and formatting code via machine learning. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for splicing and formatting code via machine learning, the system including: a memory device; and a processing device operatively coupled to the memory device, where the processing device is configured to execute computer-readable program code to perform certain functions. The system may generate a repository of a plurality of historical analysis codes and analysis parameters that are associated with or affected by each historical analysis code of the plurality of historical analysis codes, where the plurality of historical analysis codes include multiple different formats of codes and are associated with multiple application types. The system also includes a step of receiving a request for a set of analysis codes for analyzing a first application from a computing device of a user. The system also includes a step of determining a set of analysis parameters associated with the first application. The system also includes determine the set of analysis codes for analyzing the first application through machine learning analysis of the repository to determine which of the plurality of historical analysis codes matches the determined set of analysis parameters. The system also includes generating the set of analysis codes for analyzing the first application by splicing together the determined set of analysis codes, where at least one analysis code of the set of analysis codes for analyzing the first application is not in a format that is compatible with the first application. The system also includes converting the set of analysis codes for analyzing the first application into the format that is compatible with the first application. The system may also include automatically executing the converted set of analysis codes for analyzing the first application on the first application within a testing environment. The system also includes automatically causing a user interface of the computing device of the user to display results of the executed converted set of analysis codes for analyzing the first application on the first application within the testing environment. Other embodiments of this aspect include corresponding computer systems, apparatus, and computer programs recorded on one or more computer storage devices, each configured to perform the actions of the methods.

Implementations may include one or more of the following features. For example, the system may determine a second set of analysis parameters that are associated with the determined set of analysis codes, where the second set of analysis parameters include analysis parameters that are indirectly affected by the set of analysis codes for analyzing the first application. The system may also include determining a second set of analysis codes for analyzing the first application through machine learning analysis of the repository to determine which of the plurality of historical analysis codes matches the determined second set of analysis parameters.

In some embodiments, the step of determining the set of analysis parameters associated with the first application may include transmitting first application information to a machine learning system that is configured to receive parameter information as an input, match the parameter information to known analysis parameters based on the input and the repository, and provide the matched known analysis parameters as an output. The system may also include receiving the output of the machine learning system, where the output includes the set of analysis parameters associated with the first application.

The step of determining the set of analysis parameters associated with the first application may, in some embodiments, includes prompting a user interface of the computing device of the user to display a request for the set of analysis parameters associated with the first application. The system may also include receiving, from the computing device of the user, the set of analysis parameters associated with the first application.

Determining at least one of the analysis codes of the set of analysis codes for analyzing the first application may include a step of determining that multiple similar analysis codes that match at least one of the set of analysis parameters. In such embodiments, the system may also include ranking each of the multiple similar analysis codes based on (i) historical similarities with the current application, (ii) a degree of closeness or connectivity to the current application, (iii) an historical amount of errors previously identified in each of the multiple similar analysis codes, (iv) an amount of time since creation of each of the multiple similar analysis codes, and (v) an amount of time since a last update or revision to each of the multiple similar analysis codes. The system may also include selecting a highest ranked analysis code of the multiple similar analysis codes to be included in the set of analysis codes for analyzing the first application. The system where the processing device is further configured to execute computer-readable program code to: cause a neural network system to generate a testing application network map including multiple degrees of connections between applications, analysis parameters associated with those applications, and historical analysis codes used to test each of those applications and analysis parameters, based on the repository. The system where the first application includes a new application to be entered into a production environment. The system where the first application includes a modified application that is already present in a production environment. Implementations of the described techniques may include hardware, a method or process, or computer software on a computer-accessible medium.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
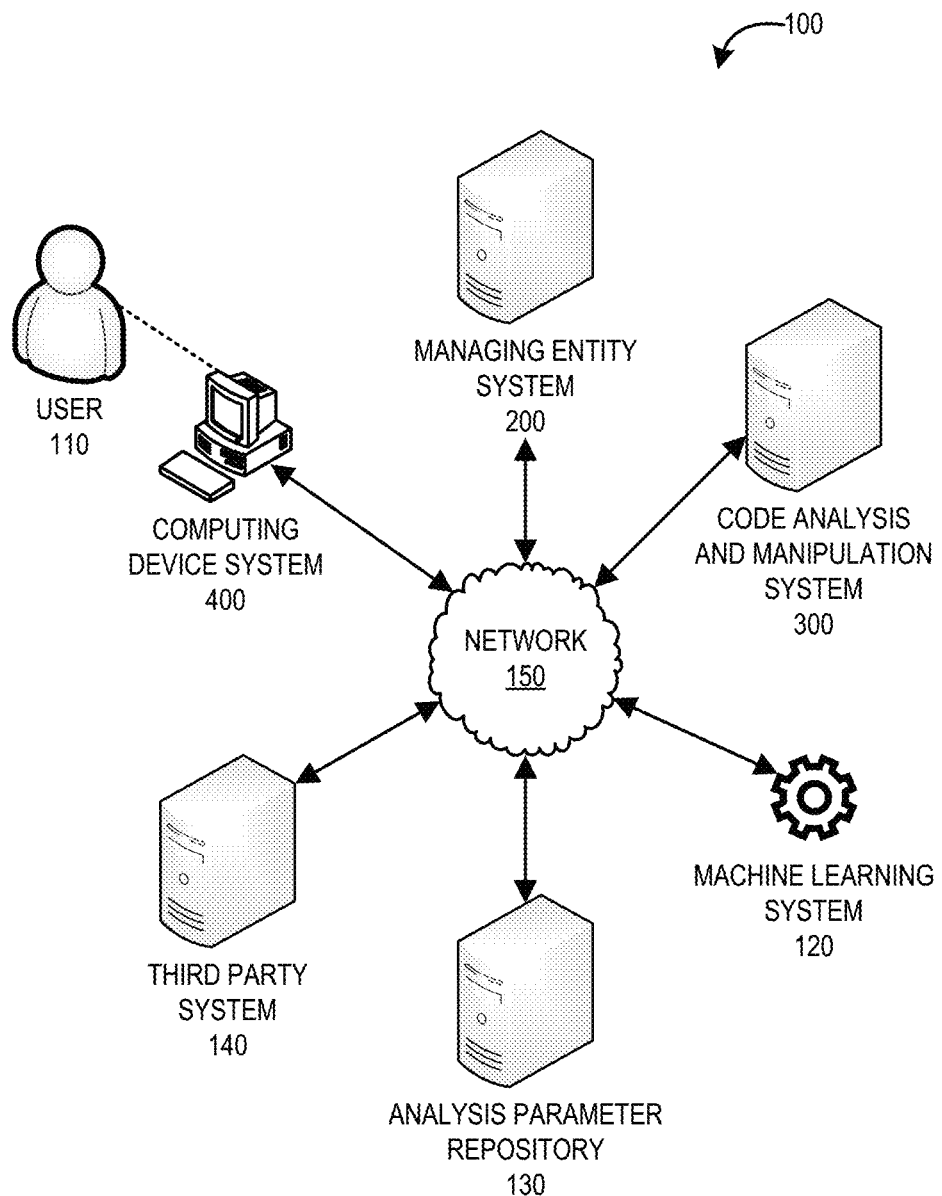
Figure 2:
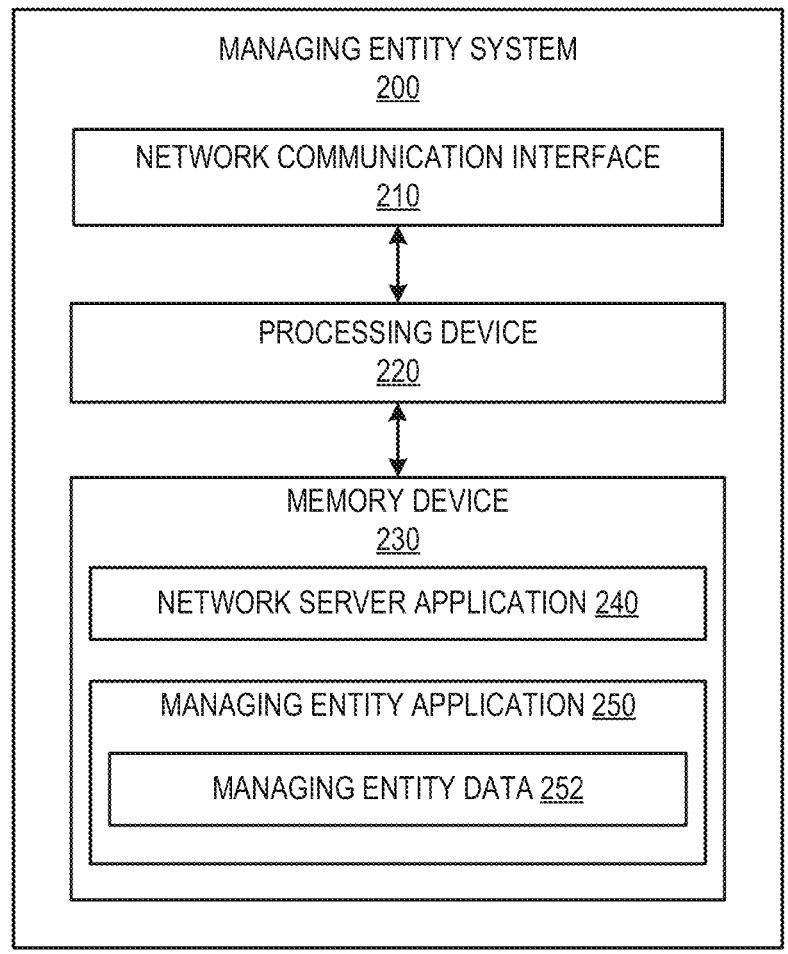
Figure 3:
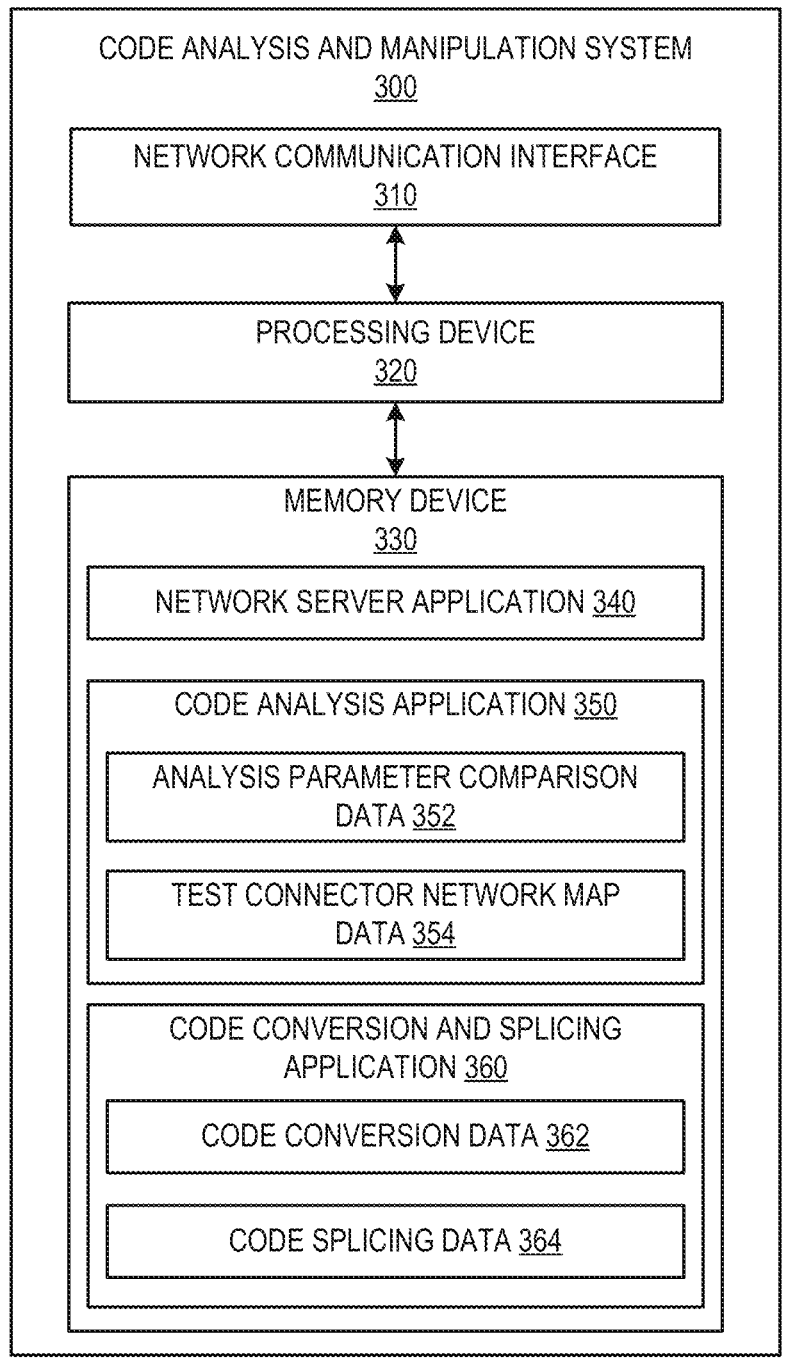
Figure 4:
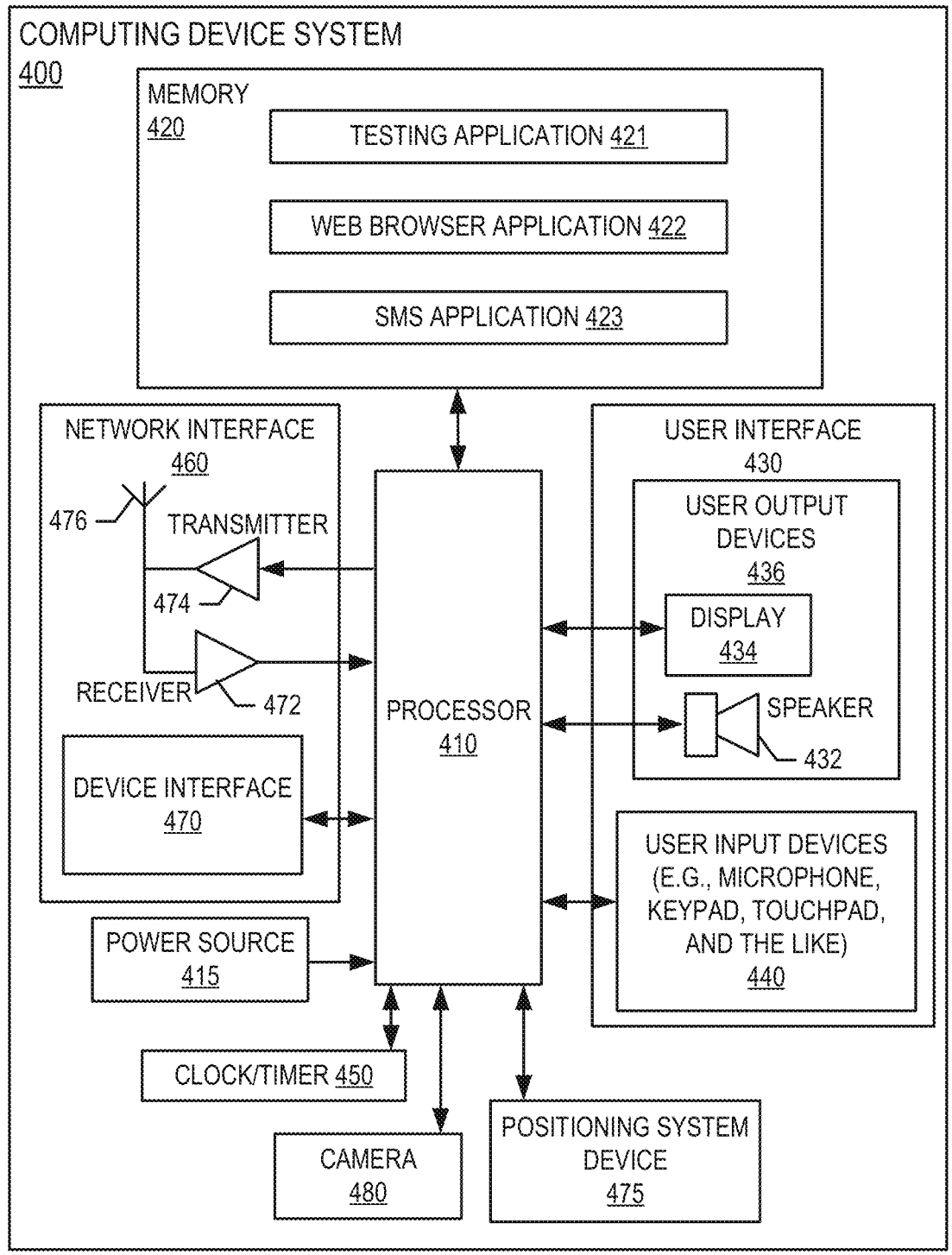
Figure 5:
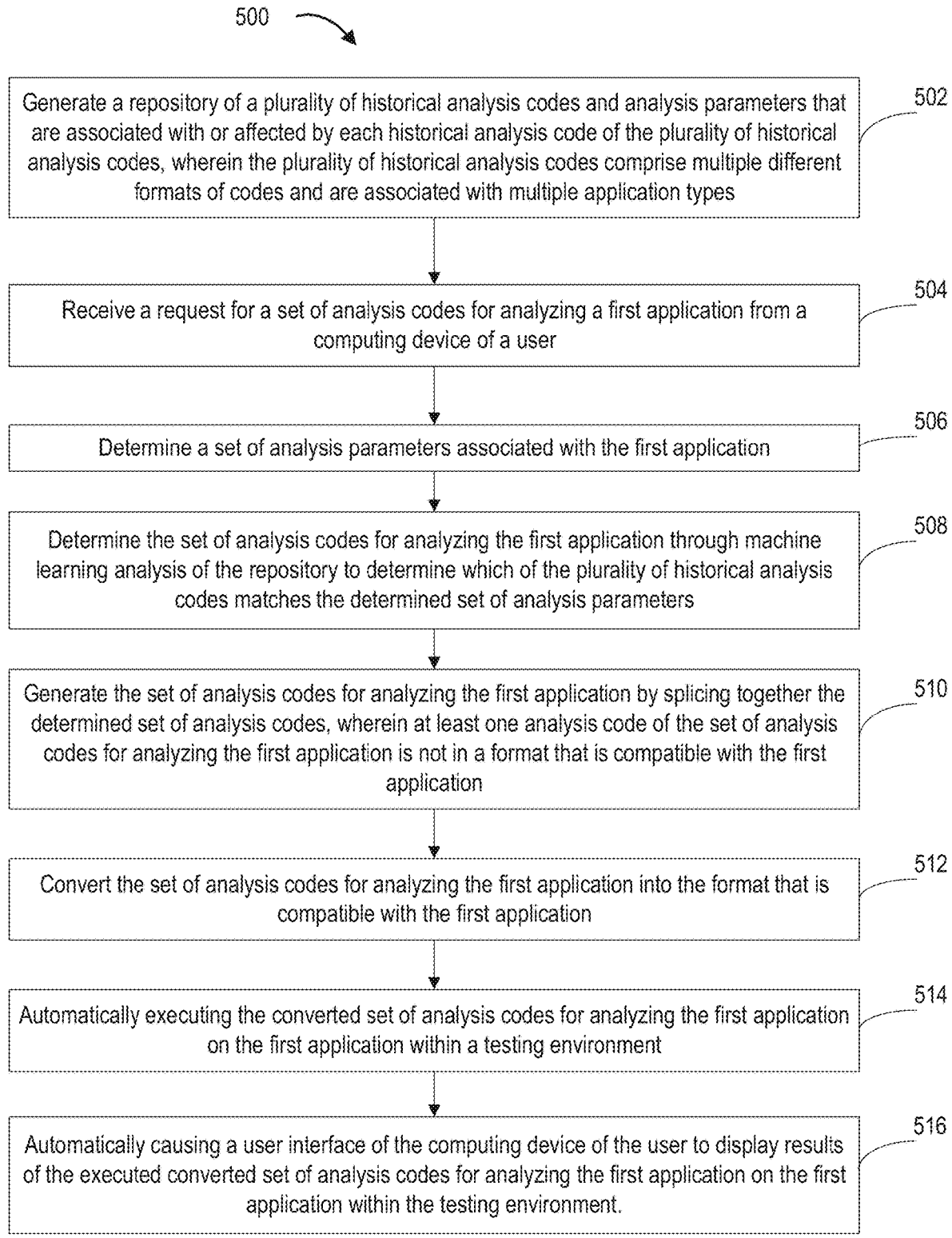

Having thus described embodiments of the invention in general terms, reference will now be made the accompanying drawings, wherein:

FIG. 1 provides a block diagram illustrating a system environment for splicing and formatting code via machine learning, in accordance with an embodiment of the invention;

FIG. 2 provides a block diagram illustrating the managing entity system of FIG. 1, in accordance with an embodiment of the invention;

FIG. 3 provides a block diagram illustrating the code analysis and manipulation system of FIG. 1, in accordance with an embodiment of the invention;

FIG. 4 provides a block diagram illustrating the computing device system of FIG. 1, in accordance with an embodiment of the invention; and FIG. 5 provides a flowchart illustrating a process for splicing and formatting code via machine learning, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

FIG. 1 provides a block diagram illustrating a system environment 100 for splicing and formatting code via machine learning, in accordance with an embodiment of the invention. As illustrated in FIG. 1, the environment 100 includes a managing entity system 200, a code analysis and manipulation system 300, a machine learning system 120, an analysis parameter repository 130, one or more computing device systems 400, and one or more third party systems 140. One or more users 110 may be included in the system environment 100, and may interact with the systems of the system environment 100 via a user interface of a computing device system 400. In some embodiments, the user(s) 110 of the system environment 100 may be employees of the managing entity associated with the managing entity system 200, or may otherwise be experts trained in application testing or other analysis and application integration.

The managing entity system 200, the code analysis and manipulation system 300, the machine learning system 120, the analysis parameter repository, the computing device system 400, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the code analysis and manipulation system 300, the machine learning system 120, the analysis parameter repository 130, the one or more computing device systems 400, and/or the third party system 140 across the network 150. However, in some embodiments, the managing entity system 200 includes at least a portion of one or more of the code analysis and manipulation system 300, the machine learning system 120, the analysis parameter repository 130, and/or the computing device system 400.

The managing entity system 200 may be configured to perform (or instruct other systems to perform) one or more other process steps described herein (e.g., the steps set forth in FIG. 5). The managing entity system 200 is described in more detail with respect to FIG. 2.

The code analysis and manipulation system 300 may be a system owned or controlled by the managing entity and/or a third party that specializes in the identification, generation, and manipulation of application testing code. In general, the code analysis and manipulation system 300 is configured to communicate information or instructions with the managing entity system 200, the machine learning system 120, the analysis parameter repository 130, the computing device system 400, and/or the third party system 140 across the network 150.

For example, the code analysis and manipulation system 300 may receive, from the computing device system 400, a request for a set of analysis codes for a particular application. The code analysis and manipulation system 300 may also determine analysis parameters for a particular application, and interact with the machine learning system 120 and the analysis parameter repository 130 to determine the set of analysis codes for analyzing the particular application. Furthermore, the code analysis and manipulation system 300 may be configured to splice together the determined set of analysis codes for analyzing the particular application and/or to convert the set of analysis codes into a format that is compatible with the particular application. In some embodiments, the code analysis and manipulation system 300 may also be configured to execute the aggregated and formatted analysis codes on the particular application within a testing environment and automatically transmit results of the test to the computing device system 400.

Of course, the code analysis and manipulation system 300 may additionally or alternatively be configured to perform (or instruct other systems to perform) one or more other process steps described herein. In some embodiments, the code analysis and manipulation system 300 includes at least a portion of the machine learning system 120 and/or the analysis parameter repository 130. Additionally or alternatively, at least a portion of the code analysis and manipulation system 300 may be a component of the managing entity system 200. The code analysis and manipulation system 300 is described in more detail with respect to FIG. 3.

The computing device system 400 may be a system owned or controlled by the managing entity and/or a third party that specializes in displaying or otherwise presenting application testing results. In general, the computing device system 400 is configured to communicate information or instructions with the managing entity system 200, the code analysis and manipulation system 300, the machine learning system 120, the analysis parameter repository 130, and/or the third party system 140 across the network 150.

For example, the computing device system 400 may transmit a request for a set of analysis codes for analyzing a particular application to the managing entity system 200 and/or the code analysis and manipulation system 300. Additionally or alternatively, the computing device system 400 may receive instructions from the managing entity system 200 and/or the code analysis and manipulation system 300 that cause a user interface of the computing device system 400 to display results of an application test for the particular application. Of course, the computing device system 400 may be configured to perform (or instruct other systems to perform) one or more other process steps described herein. In some embodiments, the computing device system 400 is a component of the managing entity system 200 (e.g., as a workstation for a user 110 that is an employee of the managing entity system 200). The computing device system 400 is described in more detail with respect to FIG. 4.

The machine learning system 120 may comprise a network communication interface, a processing device, and one or more memory devices, where the processing devices are configured to perform certain actions with the memory devices and communicate these actions to the rest of the network 150 through the network communication interface. The machine learning system 120 may comprise an artificial intelligence system that utilizes neural networks and specialized algorithms to analyze and find relationships between information stored in the analysis parameter repository 130, as well as to analyze and process information about applications being tested and the analysis parameters that are associated with those applications being tested.

The machine learning system 120 may utilize supervised learning, unsupervised learning, and/or reinforcement learning to process the information it receives as input, analyze information stored in the analysis parameter repository 130 or other third-party systems 140, and generate output based on such information.

In some embodiments, the machine learning system 120 generates a testing application network map (or a test connector map or network) based on the information stored in the application parameter repository 130. This application network map connects, links, or otherwise associates certain portions of historical analysis code with the applications that are directly and indirectly affected by changes to certain application parameters or application configurations. The testing application network map may be published or otherwise transmitted to other systems of the system environment 100 (e.g., the managing entity system 200, the code analysis and manipulation system 300, the computing device system 400, and/or a third-party system 140. The machine learning system 120 may automatically update this testing application network map in real-time, or may automatically update the testing application network map in direct response to a determination that information in the analysis parameter repository 130 has changed or been added. In this way, any system that is accessing the generated testing application network map will have an up-to-date account of which applications likely are affected (or may be affected), both directly and indirectly, by new applications or changes to existing applications.

In some embodiments, the machine learning system 120 is a component of the managing entity system 200 and/or the code analysis and manipulation system 300.

The application parameter repository 130 may comprise a network communication interface, a processing device, and one or more memory devices, where the processing devices are configured to perform certain actions with the memory devices and communicate these actions to the rest of the network 150 through the network communication interface. The analysis parameter repository 130 may comprise a knowledge base of historical application codes (i.e., codes that were previously used to test new or modified applications), information regarding which applications or application components were affected by certain additions or modifications to other applications, information regarding which previously analyzed analysis parameters (i.e., test parameters) were found to impact other applications across the enterprise, and the like. As such, this analysis parameter repository 130 may be utilized by the managing entity system 200, the code analysis and manipulation system 300, and/or the machine learning system 120 to perform additional analysis (e.g., machine learning analysis) on the large amount of historical data that is stored within the analysis parameter repository, which in turn can inform the analysis of current or future application testing strategies.

The third party system 140 may be any system that provides historical application parameter and application testing code information, machine learning analysis, third party interface information, regulatory information, and the like to the managing entity system 200 and/or any other systems represented in the system environment 100.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252 and other computer-executable instructions or other data. The computer-executable program code of the network server application 240 and/or the managing entity application 250 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise information about a plurality of applications within an enterprise, testing or regulatory requirements for applications within the enterprise, testing or regulatory standards within the enterprise, connections or other relationships between two or more applications across the enterprise, and/or the like.

The network server application 240 and the managing entity application 250 are configured to invoke or use the managing entity data 252 and the like when communicating through the network communication interface 210 with the code analysis and manipulation system 300, the machine learning system 120, the analysis parameter repository 130, the computing device system 400, and/or the third party system 140 across the network 150.

FIG. 3 provides a block diagram illustrating the code analysis and manipulation system 300, in greater detail, in accordance with embodiments of the invention. As illustrated in FIG. 3, in one embodiment of the invention, the code analysis and manipulation system 300 includes one or more processing devices 320 operatively coupled to a network communication interface 310 and a memory device 330. In certain embodiments, the code analysis and manipulation system 300 is operated by a first entity, such as a financial institution, while in other embodiments, the code analysis and manipulation system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the code analysis and manipulation system 300 described herein. For example, in one embodiment of the code analysis and manipulation system 300, the memory device 330 includes, but is not limited to, a network server application 340, a code analysis application 350 which includes analysis parameter comparison data 352 and test connector map data 354, a code conversion and splicing application 360 which includes code conversion data 362 and code splicing data 364, and other computer-executable instructions or other data. The computer-executable program code of the network server application 340, the code analysis application 350, and/or the code conversion and splicing application 360 may instruct the processing device 320 to perform certain logic, data-processing, and data-storing functions of the code analysis and manipulation system 300 described herein, as well as communication functions of the code analysis and manipulation system 300.

In one embodiment, the code analysis application 350 includes analysis parameter comparison data 352 and test connector map data 354. The analysis parameter comparison data 352 may comprise information associated with which analysis codes (i.e., testing codes) are associated with a certain application (e.g., an application that is being tested or otherwise analyzed for how it will operate on its own and how it will integrate with upstream applications, down applications, disparate applications, and third-party interfaces). As such, the analysis parameter comparison data 352 may be analyzed by the code analysis and manipulation system 300 (either alone or in conjunction with the machine learning system 120) to determine which analysis codes (and/or analysis code types) should be used to test a particular application, based on certain information about that particular application. In some embodiments, the analysis parameter comparison data 352 is a component of the analysis parameter repository 130.

The test connector map data 354 may include a testing application network map, or other resource that illustrates or otherwise shows links, connections, or other associations between a particular analysis code and other applications (e.g., upstream application, downstream applications, disparate applications, and/or third-party interfaces) that may be affected based on the identified analysis code, the analysis parameter(s), and historical data. As described herein, the test connector map data 354 may be analyzed by, or may be generated by, the machine learning system 120.

In one embodiment, the code conversion and splicing application 360 includes code conversion data 362 and code splicing data 364. The code conversion data 362 may include information regarding current formats of certain analysis code (including historical or previously used analysis code), a format of code used in an application that is currently being tested or otherwise analyzed, and instructions for converting different code (or portions of code) from one or more incompatible formats to the format of code that is used in the application that is currently being tested.

The code splicing data 364 may include information associated with which code portions to extract from historically-used analysis code, instructions for extracting such historical code without losing functionality of the code, instructions for modifying historically-used analysis code to be useful and appropriate for the analysis of a different application, instructions for compiling a set of multiple analysis codes, and the like.

The network server application 340, the code analysis application 350, and the code conversion and splicing application 360 are configured to invoke or use the analysis parameter comparison data 352, the test connector map data 354, the code conversion data 362, the code splicing data 364, and the like when communicating through the network communication interface 310 with the managing entity system 200, the machine learning system 120, the analysis parameter repository 130, the computing device system 400, and/or the third party system 140.

FIG. 4 provides a block diagram illustrating a computing device system 400 of FIG. 1 in more detail, in accordance with embodiments of the invention. In one embodiment of the invention, the computing device system 400 is a workstation owned or managed by the managing entity that controls the managing entity system 200. However, it should be understood that a workstation is merely illustrative of one type of computing device system 400 that may benefit from, employ, or otherwise be involved with embodiments of the present invention and, therefore, should not be taken to limit the scope of embodiments of the present invention. Other types of computing devices may include desktop computers, laptop computers, portable digital assistants (PDAs), pagers, mobile televisions, gaming devices, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/ code executed by the processor 410 to implement the functions of the computing device system 400 and/or one or more of the process/method steps described herein. For example, the memory 420 may include such applications as a conventional web browser application 422 and/or a testing application 421 (or any other application provided by the managing entity system 200). These applications also typically instructions to a graphical user interface (GUI) on the display 430 that allows the user 110 to interact with the computing device system 400, the managing entity system 200, and/or other devices or systems. In other embodiments of the invention, the user 110 interacts with the managing entity system 200 or the code analysis and manipulation system 300 via the Internet or an intranet web browser application 422 in addition to, or instead of, the testing application 421.

The memory 420 of the computing device system 400 may comprise a Short Message Service (SMS) application 423 configured to send, receive, and store data, information, communications, alerts, and the like via a wireless telephone network.

The testing application 421 may comprise an application configured to perform application testing activities for applications within an enterprise (e.g., associated with the managing entity system). The testing application 421 may allow the user 110 to input information about an application that will be new to the system environment (or that is already in the system environment but is being updated or modified) and then performs one or more application testing procedures on that information and/or new application within a testing environment. The testing application 421 may be configured to transmit and receive instructions to and from the managing entity system 200, the code analysis and manipulation system 300, the machine learning system 120, the analysis parameter repository 130, and/or a third party system 140.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIG. 5, a flowchart is provided to illustrate one embodiment of a process 500 for identifying, splicing, and formatting code via machine learning for application analysis, in accordance with embodiments of the invention. In some embodiments, the process 500 may include block 502, where the system generates a repository of a plurality of historical analysis codes and analysis parameters that are associated with or affected by each historical analysis code of the plurality of historical analysis codes, wherein the plurality of historical analysis codes comprise multiple different formats of codes and are associated with multiple application types.

In some embodiments, the system may additionally cause a neural network system to generate a testing application network map comprising multiple degrees of connections between applications, analysis parameters associated with those applications, and historical analysis codes used to test each of those applications and analysis parameters, based on the repository.

In some embodiments, the process 500 includes block 504, where the system receives a request for a set of analysis codes for analyzing a first application from a computing device of a user. In some embodiments, the first application comprises a new application to be entered into a production environment. In other embodiments, the first application comprises a modified application that is already present in a production environment.

Additionally, in some embodiments, the process 500 includes block 506, where the system determines a set of analysis parameters associated with the first application.

In some such embodiments, the step of determining the set of analysis parameters associated with the first application comprises transmitting first application information to a machine learning system that is configured to receive parameter information as an input, match the parameter information to known analysis parameters based on the input and the repository, and provide the matched known analysis parameters as an output. Additionally, the system may then receive the output of the machine learning system, wherein the output comprises the set of analysis parameters associated with the first application.

In other such embodiments, the step of determining the set of analysis parameters associated with the first application comprise the step of prompting a user interface of the computing device of the user to display a request for the set of analysis parameters associated with the first application. Additionally, the system may then receive, from the computing device of the user, the set of analysis parameters associated with the first application.

The process 500 may also include block 508, where the system determines the set of analysis codes for analyzing the first application through machine learning analysis of the repository to determine which of the plurality of historical analysis codes matches the determined set of analysis parameter.

In some embodiments, determining at least one of the analysis codes of the set of analysis codes for analyzing the first application comprises a step of determining multiple similar analysis codes that match at least one of the set of analysis parameters. In such embodiments, the system may then rank each of the multiple similar analysis codes based on (i) historical similarities with the current application, (ii) a degree of closeness or connectivity to the current application, (iii) an historical amount of errors previously identified in each of the multiple similar analysis codes, (iv) an amount of time since creation of each of the multiple similar analysis codes, and (v) an amount of time since a last update or revision to each of the multiple similar analysis code. The system may then select a highest ranked analysis code of the multiple similar analysis codes to be included in the set of analysis codes for analyzing the first application.

In some embodiments, the machine learning analysis may further be configured to determine a second set of analysis parameters that are associated with the determined set of analysis codes, wherein the second set of analysis parameters comprise analysis parameters that are indirectly affected by the set of analysis codes for analyzing the first application. For example, although a particular analysis code may be configured to analyze whether a particular feature of the first application will operate correctly or in a manner that does not disrupt the first application or any of its immediate dependencies or parent applications, that feature may have a collateral impact on a separate application (or third-party interface) that is not a direct interaction or immediately apparent from an analysis of only the immediate application (i.e., the first application). For example, if information like a passcode is being acquired as part of the first application, the format of the passcode acquisition or storage may be perfectly suitable for the first application and one of its immediate dependencies. However, a completely separate application may access the database that the first application stores passcode information in, and this separate application is configured to pull passcode data from that database. If the format of the stored passcode is not compatible with the separate application, then an error should be reported during the analysis (i.e., testing) of the first application. Furthermore, even if the format of the passcode was compatible with the separate application, there may be a second separate application that extracts data associated with the passcode form the separate application, and therefore analysis parameters should be identified for this second separate application as well.

In such embodiments, the machine learning analysis may further be configured to determine a second set of analysis codes for analyzing the first application through machine learning analysis of the repository to determine which of the plurality of historical analysis codes matches the determined second set of analysis parameters.

In some embodiments, the process 500 includes block 510, where the system generates the set of analysis codes for analyzing the first application by splicing together the determined set of analysis codes, wherein at least one analysis code of the set of analysis codes for analyzing the first application is not in a format that is compatible with the first application.

Additionally, in some embodiments, the process 500 includes block 512, where the system converts the set of analysis codes for analyzing the first application into the format that is compatible with the first application.

The steps of aggregating and/or splicing together portions of analysis codes (i.e., test codes) together may further include an analysis of a location of each code and the first application within the enterprise to ensure that appropriate security standards (e.g., security layers, security requirements, and the like) will be met by the resulting code. As such, the system may contemplate horizontal layering of the first application within the enterprise, ensuring that the first application is compatible with, and possesses the appropriate security characteristics for, its horizontal counterparts. In this way, the machine learning system is able to identify the analysis code that is appropriate for the level of security, as well as performance, of the first application.

The process 500 may include block 514, where the system automatically executes the converted set of analysis codes for analyzing the first application on the first application within a testing environment.

Finally, the process 500 may continue to block 516, where the system Automatically causes a user interface of the computing device of the user to display results of the executed converted set of analysis codes for analyzing the first application on the first application within the testing environment.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for splicing and formatting code via machine learning, the system comprising:
    a memory device storing computer-readable program code; and
    a processing device operatively coupled to the memory device, wherein the processing device is configured to execute the computer-readable program code to:
    generate a repository of a plurality of historical analysis codes, wherein the plurality of historical analysis codes comprise multiple different formats of codes and are associated with multiple application types;
    cause a neural network system to generate a testing application network map comprising multiple degrees of connections between applications, analysis parameters associated with the applications, and historical analysis codes used to test each of the applications and the analysis parameters, based on the repository;
    receive a request for a set of analysis codes for analyzing a first application from a computing device of a user;
    determine a first set of analysis parameters associated with the first application;
    determine a first set of analysis codes for analyzing the first application through machine learning analysis of the repository to determine which of the plurality of historical analysis codes matches the determined first set of analysis parameters;
    determine, based on the testing application network map, a second set of analysis parameters that is associated with the determined first set of analysis codes, wherein the determined second set of analysis parameters comprises analysis parameters that are indirectly affected by the determined first set of analysis codes for analyzing the first application;
    determine a second set of analysis codes for analyzing the first application through the machine learning analysis of the repository to determine which of the plurality of historical analysis codes matches the determined second set of analysis parameters;
    generate a combined set of analysis codes for analyzing the first application by splicing together the determined first set of analysis codes and the determined second set of analysis codes, wherein at least one analysis code of the combined set of analysis codes for analyzing the first application is not in a format that is compatible with the first application;
    convert the combined set of analysis codes for analyzing the first application into the format that is compatible with the first application;
    automatically execute the converted combined set of analysis codes for analyzing the first application on the first application within a testing environment; and
    automatically cause a user interface of the computing device of the user to display results of the executed converted combined set of analysis codes for analyzing the first application on the first application within the testing environment.

2. The system of claim 1, wherein determining the first set of analysis parameters associated with the first application comprises:
    transmitting first application information to a machine learning system that is configured to receive parameter information as an input, match the parameter information to known analysis parameters based on the input and the repository, and provide the matched known analysis parameters as an output; and
    receiving the output of the machine learning system, wherein the output comprises the first set of analysis parameters associated with the first application.

3. The system of claim 1, wherein determining the first set of analysis parameters associated with the first application comprises:
    prompting the user interface of the computing device of the user to display a request for the first set of analysis parameters associated with the first application; and
    receiving, from the computing device of the user, the first set of analysis parameters associated with the first application.

4. The system of claim 1, wherein determining which of the plurality of historical analysis codes matches the determined first set of analysis parameters comprises:
    determining multiple similar historical analysis codes that match at least one analysis parameter of the first set of analysis parameters;
    ranking each of the multiple similar historical analysis codes based on (i) historical similarities with a current application, (ii) a degree of closeness or connectivity to the current application, (iii) an historical amount of errors previously identified in each of the multiple similar historical analysis codes, (iv) an amount of time since creation of each of the multiple similar historical analysis codes, and (v) an amount of time since a last update or revision to each of the multiple similar historical analysis codes; and selecting a highest ranked analysis code of the multiple similar historical analysis codes to be included in the determined first set of analysis codes for analyzing the first application.

5. The system of claim 1, wherein the first application comprises a new application to be entered into a production environment.

6. The system of claim 1, wherein the first application comprises a modified application that is already present in a production environment.

7. A computer program product for splicing and formatting code via machine learning, the computer program product comprising at least one non-transitory computer readable medium comprising computer readable instructions, the computer readable instructions comprising instructions for:

generating a repository of a plurality of historical analysis codes, wherein the plurality of historical analysis codes comprise multiple different formats of codes and are associated with multiple application types;

causing a neural network system to generate a testing application network map comprising multiple degrees of connections between applications, analysis parameters associated with the applications, and historical analysis codes used to test each of the applications and the analysis parameters, based on the repository;

receiving a request for a set of analysis codes for analyzing a first application from a computing device of a user;

determining a first set of analysis parameters associated with the first application;

determining a first set of analysis codes for analyzing the first application through machine learning analysis of the repository to determine which of the plurality of historical analysis codes matches the determined first set of analysis parameters;

determining, based on the testing application network map, a second set of analysis parameters that is associated with the determined first set of analysis codes, wherein the determined second set of analysis parameters comprises analysis parameters that are indirectly affected by the first set of analysis codes for analyzing the first application;

determining a second set of analysis codes for analyzing the first application through the machine learning analysis of the repository to determine which of the plurality of historical analysis codes matches the determined second set of analysis parameters;

generating a combined set of analysis codes for analyzing the first application by splicing together the determined first set of analysis codes and the determined second set of analysis codes, wherein at least one analysis code of the combined set of analysis codes for analyzing the first application is not in a format that is compatible with the first application;

converting the combined set of analysis codes for analyzing the first application into the format that is compatible with the first application;

automatically executing the converted combined set of analysis codes for analyzing the first application on the first application within a testing environment; and automatically causing a user interface of the computing device of the user to display results of the executed converted combined set of analysis codes for analyzing the first application on the first application within the testing environment.

8. The computer program product of claim 7, wherein determining the first set of analysis parameters associated with the first application comprises:

transmitting first application information to a machine learning system that is configured to receive parameter information as an input, match the parameter information to known analysis parameters based on the input and the repository, and provide the matched known analysis parameters as an output; and receiving the output of the machine learning system, wherein the output comprises the first set of analysis parameters associated with the first application.

9. The computer program product of claim 7, wherein determining the first set of analysis parameters associated with the first application comprises:

prompting the user interface of the computing device of the user to display a request for the first set of analysis parameters associated with the first application; and receiving, from the computing device of the user, the first set of analysis parameters associated with the first application.

10. The computer program product of claim 7, wherein determining which of the plurality of historical analysis codes matches the determined first set of analysis parameters comprises:

determining multiple similar historical analysis codes that match at least one analysis parameter of the first set of analysis parameters;

ranking each of the multiple similar historical analysis codes based on (i) historical similarities with a current application, (ii) a degree of closeness or connectivity to the current application, (iii) an historical amount of errors previously identified in each of the multiple similar historical analysis codes, (iv) an amount of time since creation of each of the multiple similar historical analysis codes, and (v) an amount of time since a last update or revision to each of the multiple similar historical analysis codes; and selecting a highest ranked analysis code of the multiple similar historical analysis codes to be included in the first set of analysis codes for analyzing the first application.

11. The computer program product of claim 7, wherein the first application comprises a new application to be entered into a production environment.

12. The computer program product of claim 7, wherein the first application comprises a modified application that is already present in a production environment.

13. A computer implemented method for splicing and formatting code via machine learning, said computer implemented method comprising:

generating a repository of a plurality of historical analysis codes, wherein the plurality of historical analysis codes comprise multiple different formats of codes and are associated with multiple application types;

causing a neural network system to generate a testing application network map comprising multiple degrees of connections between applications, analysis parameters associated with the applications, and historical analysis codes used to test each of the applications and the analysis parameters, based on the repository;

receiving a request for a set of analysis codes for analyzing a first application from a computing device of a user;

determining a first set of analysis parameters associated with the first application;

determining a first set of analysis codes for analyzing the first application through machine learning analysis of the repository to determine which of the plurality of historical analysis codes matches the determined first set of analysis parameters;

determining, based on the testing application network map, a second set of analysis parameters that is associated with the determined first set of analysis codes, wherein the determined second set of analysis parameters comprises analysis parameters that are indirectly affected by the first set of analysis codes for analyzing the first application;

determining a second set of analysis codes for analyzing the first application through the machine learning analysis of the repository to determine which of the plurality of historical analysis codes matches the determined second set of analysis parameters;

generating a combined set of analysis codes for analyzing the first application by splicing together the determined first set of analysis codes and the determined second set of analysis codes, wherein at least one analysis code of the combined set of analysis codes for analyzing the first application is not in a format that is compatible with the first application;

converting the combined set of analysis codes for analyzing the first application into the format that is compatible with the first application;

automatically executing the converted combined set of analysis codes for analyzing the first application on the first application within a testing environment; and automatically causing a user interface of the computing device of the user to display results of the executed converted combined set of analysis codes for analyzing the first application on the first application within the testing environment.

14. The computer implemented method of claim 13, wherein determining the first set of analysis parameters associated with the first application comprises:

transmitting first application information to a machine learning system that is configured to receive parameter information as an input, match the parameter information to known analysis parameters based on the input and the repository, and provide the matched known analysis parameters as an output; and receiving the output of the machine learning system, wherein the output comprises the first set of analysis parameters associated with the first application.

15. The computer implemented method of claim 13, wherein determining the first set of analysis parameters associated with the first application comprises:

prompting the user interface of the computing device of the user to display a request for the first set of analysis parameters associated with the first application; and receiving, from the computing device of the user, the first set of analysis parameters associated with the first application.

* * * * *